(12) United States Patent
Held

(10) Patent No.: US 9,441,504 B2
(45) Date of Patent: Sep. 13, 2016

(54) SYSTEM AND METHOD FOR MANAGING THERMAL ISSUES IN ONE OR MORE INDUSTRIAL PROCESSES

(75) Inventor: Timothy James Held, Akron, OH (US)

(73) Assignee: Echogen Power Systems, LLC, Akron, OH (US)

( * ) Notice: Subject to any disclaimer, the term of this patent is extended or adjusted under 35 U.S.C. 154(b) by 775 days.

(21) Appl. No.: 13/380,110

(22) PCT Filed: Jun. 22, 2010

(86) PCT No.: PCT/US2010/039559
§ 371 (c)(1),
(2), (4) Date: Feb. 9, 2012

(87) PCT Pub. No.: WO2010/151560
PCT Pub. Date: Dec. 29, 2010

(65) Prior Publication Data
US 2012/0128463 A1    May 24, 2012

Related U.S. Application Data

(60) Provisional application No. 61/219,195, filed on Jun. 22, 2009.

(51) Int. Cl.
*F01K 25/10* (2006.01)
*F01K 23/10* (2006.01)

(52) U.S. Cl.
CPC .............. *F01K 25/10* (2013.01); *F01K 23/10* (2013.01); *F01K 25/103* (2013.01); *Y02E 20/16* (2013.01); *Y02T 10/16* (2013.01)

(58) Field of Classification Search
CPC ........... F04D 29/5826; F04D 29/5833; F01K 25/10; F01K 25/103; F01K 23/10
USPC .................. 415/1, 175–179; 60/728, 39.093
See application file for complete search history.

(56) References Cited

U.S. PATENT DOCUMENTS

| 2,575,478 A | 11/1951 | Wilson |
| 2,634,375 A | 4/1953 | Guimbal |

(Continued)

FOREIGN PATENT DOCUMENTS

| CA | 2794150 A1 | 11/2011 |
| CN | 1165238 A | 11/1997 |

(Continued)

OTHER PUBLICATIONS

Alpy, N., et al., "French Atomic Energy Commission views as regards SCO2 Cycle Development priorities and related R&D approach," Presentation, Symposium on SCO2 Power Cycles, Apr. 29-30, 2009, Troy, NY, 20 pages.

(Continued)

*Primary Examiner* — Richard Edgar
*Assistant Examiner* — Brian P Wolcott
(74) *Attorney, Agent, or Firm* — Edmonds & Nolte, PC

(57) ABSTRACT

The present invention generally relates to a system that enables one to both: (i) address various thermal management issues (e.g., inlet air cooling) in gas turbines, gas turbine engines, industrial process equipment and/or internal combustion engines; and (ii) yield a supercritical fluid-based heat engine. In one embodiment, the present invention utilizes at least one working fluid selected from ammonia, carbon dioxide, nitrogen, or other suitable working fluid medium. In another embodiment, the present invention utilizes carbon dioxide or ammonia as a working fluid to achieve a system that enables one to address inlet cooling issues in a gas turbine, internal combustion engine or other industrial application while also yielding a supercritical fluid based heat engine as a second cycle using the waste heat from the gas turbine and/or internal combustion engine to create a combined power cycle.

27 Claims, 5 Drawing Sheets

(56) References Cited

U.S. PATENT DOCUMENTS

| | | |
|---|---|---|
| 2,691,280 A | 10/1954 | Albert |
| 3,095,274 A | 6/1963 | Crawford |
| 3,105,748 A | 10/1963 | Stahl |
| 3,237,403 A | 3/1966 | Feher |
| 3,277,955 A | 10/1966 | Heller |
| 3,401,277 A | 9/1968 | Larson |
| 3,622,767 A | 11/1971 | Koepcke |
| 3,630,022 A | 12/1971 | Jubb |
| 3,736,745 A | 6/1973 | Karig |
| 3,772,879 A | 11/1973 | Engdahl |
| 3,791,137 A | 2/1974 | Jubb |
| 3,830,062 A | 8/1974 | Morgan et al. |
| 3,939,328 A | 2/1976 | Davis |
| 3,971,211 A | 7/1976 | Wethe |
| 3,982,379 A | 9/1976 | Gilli |
| 3,998,058 A | 12/1976 | Park |
| 4,009,575 A | 3/1977 | Hartman, Jr. |
| 4,029,255 A | 6/1977 | Heiser |
| 4,030,312 A | 6/1977 | Wallin |
| 4,049,407 A | 9/1977 | Bottum |
| 4,070,870 A | 1/1978 | Bahel |
| 4,099,381 A | 7/1978 | Rappoport |
| 4,119,140 A | 10/1978 | Cates |
| 4,150,547 A | 4/1979 | Hobson |
| 4,152,901 A | 5/1979 | Munters |
| 4,164,848 A | 8/1979 | Gilli |
| 4,164,849 A | 8/1979 | Mangus |
| 4,170,435 A | 10/1979 | Swearingen |
| 4,182,960 A | 1/1980 | Reuyl |
| 4,183,220 A | 1/1980 | Shaw |
| 4,198,827 A | 4/1980 | Terry et al. |
| 4,208,882 A | 6/1980 | Lopes |
| 4,221,185 A | 9/1980 | Scholes |
| 4,233,085 A | 11/1980 | Roderick |
| 4,236,869 A | 12/1980 | Laurello |
| 4,248,049 A | 2/1981 | Briley |
| 4,257,232 A | 3/1981 | Bell |
| 4,287,430 A | 9/1981 | Guido |
| 4,336,692 A | 6/1982 | Ecker |
| 4,347,711 A | 9/1982 | Noe |
| 4,347,714 A | 9/1982 | Kinsell |
| 4,372,125 A | 2/1983 | Dickenson |
| 4,384,568 A | 5/1983 | Palmatier |
| 4,391,101 A | 7/1983 | Labbe |
| 4,420,947 A | 12/1983 | Yoshino |
| 4,428,190 A | 1/1984 | Bronicki |
| 4,433,554 A | 2/1984 | Rojey |
| 4,439,687 A | 3/1984 | Wood |
| 4,439,994 A | 4/1984 | Briley |
| 4,448,033 A | 5/1984 | Briccetti |
| 4,450,363 A | 5/1984 | Russell |
| 4,455,836 A | 6/1984 | Binstock |
| 4,467,609 A | 8/1984 | Loomis |
| 4,467,621 A | 8/1984 | O'Brien |
| 4,475,353 A | 10/1984 | Lazare |
| 4,489,562 A | 12/1984 | Snyder |
| 4,489,563 A | 12/1984 | Kalina |
| 4,498,289 A | 2/1985 | Osgerby |
| 4,516,403 A | 5/1985 | Tanaka |
| 4,538,960 A | 9/1985 | Iino et al. |
| 4,549,401 A | 10/1985 | Spliethoff |
| 4,555,905 A | 12/1985 | Endou |
| 4,558,228 A | 12/1985 | Larjola |
| 4,573,321 A | 3/1986 | Knaebel |
| 4,578,953 A | 4/1986 | Krieger |
| 4,589,255 A | 5/1986 | Martens |
| 4,636,578 A | 1/1987 | Feinberg |
| 4,674,297 A | 6/1987 | Vobach |
| 4,694,189 A | 9/1987 | Haraguchi |
| 4,697,981 A | 10/1987 | Brown et al. |
| 4,700,543 A | 10/1987 | Krieger |
| 4,730,977 A | 3/1988 | Haaser |
| 4,756,162 A | 7/1988 | Dayan |
| 4,765,143 A | 8/1988 | Crawford |
| 4,773,212 A | 9/1988 | Griffin |
| 4,798,056 A | 1/1989 | Franklin |
| 4,813,242 A | 3/1989 | Wicks |
| 4,821,514 A | 4/1989 | Schmidt |
| 4,867,633 A | 9/1989 | Gravelle |
| 4,892,459 A | 1/1990 | Guelich |
| 4,986,071 A | 1/1991 | Voss |
| 4,993,483 A | 2/1991 | Harris |
| 5,000,003 A | 3/1991 | Wicks |
| 5,050,375 A | 9/1991 | Dickinson |
| 5,083,425 A | 1/1992 | Hendriks et al. |
| 5,098,194 A | 3/1992 | Kuo |
| 5,102,295 A | 4/1992 | Pope |
| 5,104,284 A | 4/1992 | Hustak, Jr. |
| 5,164,020 A | 11/1992 | Wagner |
| 5,176,321 A | 1/1993 | Doherty |
| 5,203,159 A | 4/1993 | Koizumi et al. |
| 5,228,310 A | 7/1993 | Vandenberg |
| 5,291,960 A | 3/1994 | Brandenburg |
| 5,320,482 A | 6/1994 | Palmer et al. |
| 5,335,510 A | 8/1994 | Rockenfeller |
| 5,358,378 A | 10/1994 | Holscher |
| 5,360,057 A | 11/1994 | Rockenfeller |
| 5,392,606 A | 2/1995 | Labinov |
| 5,440,882 A | 8/1995 | Kalina |
| 5,444,972 A | 8/1995 | Moore |
| 5,488,828 A | 2/1996 | Brossard |
| 5,490,386 A | 2/1996 | Keller |
| 5,503,222 A | 4/1996 | Dunne |
| 5,531,073 A | 7/1996 | Bronicki |
| 5,538,564 A | 7/1996 | Kaschmitter |
| 5,542,203 A | 8/1996 | Luoma |
| 5,570,578 A | 11/1996 | Saujet |
| 5,588,298 A | 12/1996 | Kalina |
| 5,600,967 A | 2/1997 | Meckler |
| 5,634,340 A | 6/1997 | Grennan |
| 5,647,221 A | 7/1997 | Garris, Jr. |
| 5,649,426 A | 7/1997 | Kalina |
| 5,676,382 A | 10/1997 | Dahlheimer |
| 5,680,753 A | 10/1997 | Hollinger |
| 5,738,164 A | 4/1998 | Hildebrand |
| 5,754,613 A | 5/1998 | Hashiguchi |
| 5,771,700 A | 6/1998 | Cochran |
| 5,789,822 A | 8/1998 | Calistrat |
| 5,813,215 A | 9/1998 | Weisser |
| 5,833,876 A | 11/1998 | Schnur |
| 5,862,666 A | 1/1999 | Liu |
| 5,873,260 A | 2/1999 | Linhardt |
| 5,874,039 A | 2/1999 | Edelson |
| 5,884,470 A * | 3/1999 | Frutschi .......... 60/783 |
| 5,894,836 A | 4/1999 | Wu |
| 5,899,067 A | 5/1999 | Hageman |
| 5,903,060 A | 5/1999 | Norton |
| 5,918,460 A | 7/1999 | Connell |
| 5,941,238 A | 8/1999 | Tracy |
| 5,943,869 A | 8/1999 | Cheng |
| 5,946,931 A | 9/1999 | Lomax |
| 5,973,050 A | 10/1999 | Johnson |
| 6,037,683 A | 3/2000 | Lulay |
| 6,041,604 A | 3/2000 | Nicodemus |
| 6,058,930 A | 5/2000 | Shingleton |
| 6,062,815 A | 5/2000 | Holt |
| 6,065,280 A | 5/2000 | Ranasinghe |
| 6,066,797 A | 5/2000 | Toyomura |
| 6,070,405 A | 6/2000 | Jerye |
| 6,082,110 A | 7/2000 | Rosenblatt |
| 6,105,368 A | 8/2000 | Hansen |
| 6,112,547 A | 9/2000 | Spauschus |
| 6,129,507 A | 10/2000 | Ganelin |
| 6,158,237 A | 12/2000 | Riffat |
| 6,164,655 A | 12/2000 | Bothien |
| 6,202,782 B1 | 3/2001 | Hatanaka |
| 6,223,846 B1 | 5/2001 | Schechter |
| 6,233,938 B1 | 5/2001 | Nicodemus |
| 6,282,900 B1 | 9/2001 | Bell |
| 6,282,917 B1 | 9/2001 | Mongan |
| 6,295,818 B1 | 10/2001 | Ansley |
| 6,299,690 B1 | 10/2001 | Mongeon |
| 6,341,781 B1 | 1/2002 | Matz |
| 6,374,630 B1 | 4/2002 | Jones |

(56) References Cited

U.S. PATENT DOCUMENTS

| | | |
|---|---|---|
| 6,393,851 B1 | 5/2002 | Wightman |
| 6,432,320 B1 | 8/2002 | Bonsignore |
| 6,434,955 B1 | 8/2002 | Ng |
| 6,442,951 B1 | 9/2002 | Maeda |
| 6,446,425 B1 | 9/2002 | Lawlor |
| 6,446,465 B1 | 9/2002 | Dubar |
| 6,463,730 B1 | 10/2002 | Keller |
| 6,484,490 B1 | 11/2002 | Olsen |
| 6,539,720 B2 | 4/2003 | Rouse et al. |
| 6,539,728 B2 | 4/2003 | Korin |
| 6,571,548 B1 | 6/2003 | Bronicki |
| 6,581,384 B1 | 6/2003 | Benson |
| 6,598,397 B2 | 7/2003 | Hanna |
| 6,644,062 B1 | 11/2003 | Hays |
| 6,657,849 B1 | 12/2003 | Andresakis |
| 6,668,554 B1 * | 12/2003 | Brown .................... 60/641.2 |
| 6,684,625 B2 | 2/2004 | Kline |
| 6,695,974 B2 | 2/2004 | Withers |
| 6,715,294 B2 | 4/2004 | Anderson |
| 6,734,585 B2 | 5/2004 | Tornquist |
| 6,735,948 B1 | 5/2004 | Kalina |
| 6,739,142 B2 | 5/2004 | Korin |
| 6,751,959 B1 | 6/2004 | McClanahan et al. |
| 6,769,256 B1 | 8/2004 | Kalina |
| 6,799,892 B2 | 10/2004 | Leuthold |
| 6,808,179 B1 | 10/2004 | Bhattacharyya |
| 6,810,335 B2 | 10/2004 | Lysaght |
| 6,817,185 B2 | 11/2004 | Coney |
| 6,857,268 B2 | 2/2005 | Stinger |
| 6,910,334 B2 | 6/2005 | Kalina |
| 6,918,254 B2 | 7/2005 | Baker |
| 6,921,518 B2 * | 7/2005 | Johnston .................... 422/198 |
| 6,941,757 B2 | 9/2005 | Kalina |
| 6,960,839 B2 | 11/2005 | Zimron |
| 6,960,840 B2 | 11/2005 | Willis |
| 6,962,054 B1 | 11/2005 | Linney |
| 6,964,168 B1 | 11/2005 | Pierson |
| 6,968,690 B2 | 11/2005 | Kalina |
| 6,986,251 B2 | 1/2006 | Radcliff |
| 7,013,205 B1 | 3/2006 | Hafner et al. |
| 7,021,060 B1 | 4/2006 | Kalina |
| 7,022,294 B2 | 4/2006 | Johnston |
| 7,033,533 B2 | 4/2006 | Lewis-Aburn et al. |
| 7,033,553 B2 | 4/2006 | Johnston et al. |
| 7,036,315 B2 | 5/2006 | Kang |
| 7,041,272 B2 | 5/2006 | Keefer |
| 7,047,744 B1 | 5/2006 | Robertson |
| 7,048,782 B1 | 5/2006 | Couch |
| 7,062,913 B2 | 6/2006 | Christensen |
| 7,096,665 B2 | 8/2006 | Stinger |
| 7,096,679 B2 | 8/2006 | Manole |
| 7,124,587 B1 | 10/2006 | Linney |
| 7,174,715 B2 | 2/2007 | Armitage |
| 7,194,863 B2 | 3/2007 | Ganev |
| 7,197,876 B1 | 4/2007 | Kalina |
| 7,200,996 B2 | 4/2007 | Cogswell |
| 7,234,314 B1 | 6/2007 | Wiggs |
| 7,249,588 B2 | 7/2007 | Russell |
| 7,278,267 B2 | 10/2007 | Yamada |
| 7,279,800 B2 | 10/2007 | Bassett |
| 7,287,381 B1 | 10/2007 | Pierson |
| 7,305,829 B2 | 12/2007 | Mirolli |
| 7,313,926 B2 | 1/2008 | Gurin |
| 7,340,894 B2 | 3/2008 | Miyahara et al. |
| 7,340,897 B2 | 3/2008 | Zimron |
| 7,343,746 B2 * | 3/2008 | Pierson ................... 60/772 |
| 7,406,830 B2 | 8/2008 | Valentian |
| 7,416,137 B2 | 8/2008 | Hagen et al. |
| 7,453,242 B2 | 11/2008 | Ichinose |
| 7,458,217 B2 | 12/2008 | Kalina |
| 7,458,218 B2 | 12/2008 | Kalina |
| 7,464,551 B2 | 12/2008 | Althaus et al. |
| 7,469,542 B2 | 12/2008 | Kalina |
| 7,516,619 B2 | 4/2009 | Pelletier |
| 7,600,394 B2 | 10/2009 | Kalina |
| 7,621,133 B2 | 11/2009 | Tomlinson |
| 7,654,354 B1 | 2/2010 | Otterstrom |
| 7,665,291 B2 | 2/2010 | Anand |
| 7,665,304 B2 | 2/2010 | Sundel |
| 7,685,821 B2 | 3/2010 | Kalina |
| 7,730,713 B2 | 6/2010 | Nakano |
| 7,735,335 B2 | 6/2010 | Uno |
| 7,770,376 B1 | 8/2010 | Brostmeyer |
| 7,775,758 B2 | 8/2010 | Legare |
| 7,827,791 B2 | 11/2010 | Pierson |
| 7,838,470 B2 | 11/2010 | Shaw |
| 7,841,179 B2 | 11/2010 | Kalina |
| 7,841,306 B2 | 11/2010 | Myers |
| 7,854,587 B2 | 12/2010 | Ito |
| 7,866,157 B2 | 1/2011 | Ernst |
| 7,900,450 B2 | 3/2011 | Gurin |
| 7,950,230 B2 | 5/2011 | Nishikawa |
| 7,950,243 B2 | 5/2011 | Gurin |
| 7,972,529 B2 | 7/2011 | Machado |
| 7,997,076 B2 | 8/2011 | Ernst |
| 8,096,128 B2 | 1/2012 | Held et al. |
| 8,099,198 B2 | 1/2012 | Gurin |
| 8,146,360 B2 | 4/2012 | Myers |
| 8,281,593 B2 | 10/2012 | Held |
| 8,419,936 B2 | 4/2013 | Berger et al. |
| 2001/0015061 A1 | 8/2001 | Viteri et al. |
| 2001/0020444 A1 | 9/2001 | Johnston |
| 2001/0030952 A1 | 10/2001 | Roy |
| 2002/0029558 A1 | 3/2002 | Tamaro |
| 2002/0053196 A1 * | 5/2002 | Lerner et al. ............. 60/39.182 |
| 2002/0066270 A1 | 6/2002 | Rouse et al. |
| 2002/0078696 A1 | 6/2002 | Korin |
| 2002/0078697 A1 | 6/2002 | Lifson |
| 2002/0082747 A1 | 6/2002 | Kramer |
| 2003/0000213 A1 | 1/2003 | Christensen |
| 2003/0061823 A1 | 4/2003 | Alden |
| 2003/0154718 A1 | 8/2003 | Nayar |
| 2003/0182946 A1 | 10/2003 | Sami |
| 2003/0213246 A1 | 11/2003 | Coll et al. |
| 2003/0221438 A1 | 12/2003 | Rane et al. |
| 2004/0006966 A1 * | 1/2004 | Hallman et al. .......... 60/39.093 |
| 2004/0011038 A1 | 1/2004 | Stinger |
| 2004/0011039 A1 | 1/2004 | Stinger et al. |
| 2004/0020185 A1 | 2/2004 | Brouillette et al. |
| 2004/0020206 A1 | 2/2004 | Sullivan et al. |
| 2004/0021182 A1 | 2/2004 | Green et al. |
| 2004/0035117 A1 | 2/2004 | Rosen |
| 2004/0083731 A1 | 5/2004 | Lasker |
| 2004/0083732 A1 | 5/2004 | Hanna et al. |
| 2004/0088992 A1 | 5/2004 | Brasz et al. |
| 2004/0097388 A1 | 5/2004 | Brask et al. |
| 2004/0105980 A1 | 6/2004 | Sudarshan et al. |
| 2004/0107700 A1 | 6/2004 | McClanahan et al. |
| 2004/0159110 A1 | 8/2004 | Janssen |
| 2004/0211182 A1 | 10/2004 | Gould |
| 2005/0022963 A1 | 2/2005 | Garrabrant et al. |
| 2005/0056001 A1 | 3/2005 | Frutschi |
| 2005/0096676 A1 | 5/2005 | Gifford, III et al. |
| 2005/0109387 A1 | 5/2005 | Marshall |
| 2005/0137777 A1 | 6/2005 | Kolavennu et al. |
| 2005/0162018 A1 | 7/2005 | Realmuto et al. |
| 2005/0167169 A1 | 8/2005 | Gering et al. |
| 2005/0183421 A1 | 8/2005 | Vaynberg et al. |
| 2005/0196676 A1 | 9/2005 | Singh et al. |
| 2005/0198959 A1 | 9/2005 | Schubert |
| 2005/0227187 A1 | 10/2005 | Schilling |
| 2005/0252235 A1 | 11/2005 | Critoph et al. |
| 2005/0257812 A1 | 11/2005 | Wright et al. |
| 2005/0262848 A1 * | 12/2005 | Joshi et al. ................... 60/772 |
| 2006/0010868 A1 | 1/2006 | Smith |
| 2006/0060333 A1 | 3/2006 | Chordia et al. |
| 2006/0066113 A1 | 3/2006 | Ebrahim et al. |
| 2006/0080960 A1 | 4/2006 | Rajendran et al. |
| 2006/0112693 A1 | 6/2006 | Sundel |
| 2006/0182680 A1 | 8/2006 | Keefer et al. |
| 2006/0211871 A1 | 9/2006 | Dai et al. |
| 2006/0213218 A1 | 9/2006 | Uno et al. |
| 2006/0225421 A1 | 10/2006 | Yamanaka et al. |
| 2006/0225459 A1 | 10/2006 | Meyer |

(56) References Cited

U.S. PATENT DOCUMENTS

| | | |
|---|---|---|
| 2006/0249020 A1* | 11/2006 | Tonkovich et al. ............ 95/115 |
| 2006/0254281 A1 | 11/2006 | Badeer et al. |
| 2007/0001766 A1 | 1/2007 | Ripley et al. |
| 2007/0017192 A1 | 1/2007 | Bednarek et al. |
| 2007/0019708 A1 | 1/2007 | Shiflett et al. |
| 2007/0027038 A1 | 2/2007 | Kamimura et al. |
| 2007/0056290 A1 | 3/2007 | Dahm |
| 2007/0089449 A1 | 4/2007 | Gurin |
| 2007/0108200 A1 | 5/2007 | McKinzie, II |
| 2007/0119175 A1 | 5/2007 | Ruggieri et al. |
| 2007/0130952 A1 | 6/2007 | Copen |
| 2007/0151244 A1 | 7/2007 | Gurin |
| 2007/0161095 A1 | 7/2007 | Gurin |
| 2007/0163261 A1 | 7/2007 | Strathman |
| 2007/0195152 A1 | 8/2007 | Kawai et al. |
| 2007/0204620 A1 | 9/2007 | Pronske et al. |
| 2007/0227472 A1 | 10/2007 | Takeuchi et al. |
| 2007/0234722 A1 | 10/2007 | Kalina |
| 2007/0245733 A1 | 10/2007 | Pierson et al. |
| 2007/0246206 A1 | 10/2007 | Gong et al. |
| 2008/0000225 A1 | 1/2008 | Kalina |
| 2008/0006040 A1 | 1/2008 | Peterson et al. |
| 2008/0010967 A1 | 1/2008 | Griffin et al. |
| 2008/0023666 A1 | 1/2008 | Gurin |
| 2008/0053095 A1 | 3/2008 | Kalina |
| 2008/0066470 A1 | 3/2008 | MacKnight |
| 2008/0135253 A1 | 6/2008 | Vinegar et al. |
| 2008/0163625 A1 | 7/2008 | O'Brien |
| 2008/0173450 A1 | 7/2008 | Goldberg et al. |
| 2008/0211230 A1 | 9/2008 | Gurin |
| 2008/0250789 A1 | 10/2008 | Myers et al. |
| 2008/0252078 A1 | 10/2008 | Myers |
| 2009/0021251 A1 | 1/2009 | Simon |
| 2009/0085709 A1 | 4/2009 | Meinke |
| 2009/0107144 A1 | 4/2009 | Moghtaderi et al. |
| 2009/0139234 A1 | 6/2009 | Gurin |
| 2009/0139781 A1 | 6/2009 | Straubel |
| 2009/0173337 A1 | 7/2009 | Tamaura et al. |
| 2009/0173486 A1 | 7/2009 | Copeland |
| 2009/0180903 A1 | 7/2009 | Martin et al. |
| 2009/0205892 A1 | 8/2009 | Jensen et al. |
| 2009/0211251 A1 | 8/2009 | Petersen et al. |
| 2009/0211253 A1 | 8/2009 | Radcliff et al. |
| 2009/0266075 A1 | 10/2009 | Westmeier et al. |
| 2009/0293503 A1 | 12/2009 | Vandor |
| 2010/0024421 A1 | 2/2010 | Litwin |
| 2010/0077792 A1 | 4/2010 | Gurin |
| 2010/0083662 A1 | 4/2010 | Kalina |
| 2010/0102008 A1 | 4/2010 | Hedberg |
| 2010/0122533 A1 | 5/2010 | Kalina |
| 2010/0146949 A1 | 6/2010 | Stobart et al. |
| 2010/0146973 A1 | 6/2010 | Kalina |
| 2010/0156112 A1 | 6/2010 | Held et al. |
| 2010/0162721 A1 | 7/2010 | Welch et al. |
| 2010/0205962 A1 | 8/2010 | Kalina |
| 2010/0218513 A1 | 9/2010 | Vaisman et al. |
| 2010/0218930 A1 | 9/2010 | Proeschel |
| 2010/0263380 A1 | 10/2010 | Biederman et al. |
| 2010/0287934 A1 | 11/2010 | Glynn et al. |
| 2010/0300093 A1 | 12/2010 | Doty |
| 2010/0326076 A1 | 12/2010 | Ast et al. |
| 2011/0027064 A1 | 2/2011 | Pal et al. |
| 2011/0030404 A1 | 2/2011 | Gurin |
| 2011/0048012 A1 | 3/2011 | Ernst et al. |
| 2011/0061384 A1 | 3/2011 | Held et al. |
| 2011/0061387 A1 | 3/2011 | Held et al. |
| 2011/0088399 A1 | 4/2011 | Briesch et al. |
| 2011/0179799 A1 | 7/2011 | Allam et al. |
| 2011/0185729 A1 | 8/2011 | Held |
| 2011/0192163 A1 | 8/2011 | Kasuya |
| 2011/0203278 A1 | 8/2011 | Kopecek et al. |
| 2011/0259010 A1 | 10/2011 | Bronicki et al. |
| 2011/0299972 A1 | 12/2011 | Morris |
| 2011/0308253 A1 | 12/2011 | Ritter |
| 2012/0047892 A1 | 3/2012 | Held et al. |
| 2012/0067055 A1 | 3/2012 | Held |
| 2012/0128463 A1 | 5/2012 | Held |
| 2012/0131918 A1 | 5/2012 | Held |
| 2012/0131919 A1 | 5/2012 | Held |
| 2012/0131920 A1 | 5/2012 | Held |
| 2012/0131921 A1 | 5/2012 | Held |
| 2012/0159922 A1 | 6/2012 | Gurin |
| 2012/0159956 A1 | 6/2012 | Gurin |
| 2012/0174558 A1 | 7/2012 | Gurin |
| 2012/0186219 A1 | 7/2012 | Gurin |
| 2012/0247134 A1 | 10/2012 | Gurin |
| 2012/0247455 A1 | 10/2012 | Gurin et al. |
| 2012/0261090 A1 | 10/2012 | Durmaz et al. |
| 2013/0019597 A1 | 1/2013 | Kalina |
| 2013/0033037 A1 | 2/2013 | Held et al. |
| 2013/0036736 A1 | 2/2013 | Hart et al. |
| 2013/0113221 A1 | 5/2013 | Held |

FOREIGN PATENT DOCUMENTS

| | | |
|---|---|---|
| CN | 1432102 A | 7/2003 |
| CN | 101614139 A | 12/2009 |
| CN | 202055876 U | 11/2011 |
| CN | 202544943 U | 11/2012 |
| CN | 202718721 U | 2/2013 |
| DE | 2632777 A1 | 2/1977 |
| DE | 10052993 A1 | 5/2002 |
| EP | 1977174 A2 | 10/2008 |
| EP | 1998013 A2 | 12/2008 |
| EP | 2419621 A1 | 2/2012 |
| EP | 2446122 A1 | 5/2012 |
| EP | 2478201 A1 | 7/2012 |
| EP | 2500530 A1 | 9/2012 |
| EP | 2550436 A | 1/2013 |
| GB | 856985 A | 12/1960 |
| GB | 2010974 A | 7/1979 |
| GB | 2075608 A | 11/1981 |
| JP | 60040707 A | 3/1985 |
| JP | 61-152914 A | 7/1986 |
| JP | 01-240705 A | 9/1989 |
| JP | 05-321612 A | 12/1993 |
| JP | 08028805 A | 2/1996 |
| JP | H11270352 | 5/1999 |
| JP | 2000257407 A | 9/2000 |
| JP | 2001-193419 A | 7/2001 |
| JP | 2003529715 A | 10/2003 |
| JP | 2005030727 A | 2/2005 |
| JP | 2005-533972 A1 | 11/2005 |
| JP | 2006037760 A | 2/2006 |
| JP | 2006177266 A | 7/2006 |
| JP | 2007-198200 A | 9/2007 |
| JP | 4343738 B2 | 10/2009 |
| JP | 2011-017268 A | 1/2011 |
| KR | 100191080 | 6/1999 |
| KR | 10-0766101 B1 | 10/2007 |
| KR | 10-0844634 A | 7/2008 |
| KR | 10-20100067927 A | 6/2010 |
| KR | 1020110018769 A | 2/2011 |
| KR | 2012-0068670 A | 6/2012 |
| KR | 2012-0128753 A | 11/2012 |
| KR | 2012-0128755 A | 11/2012 |
| WO | WO 91/05145 A1 | 4/1991 |
| WO | WO 96/09500 A1 | 3/1996 |
| WO | 0071944 A1 | 11/2000 |
| WO | WO 01/44658 A1 | 6/2001 |
| WO | WO 2006/060253 | 6/2006 |
| WO | WO 2006/137957 A1 | 12/2006 |
| WO | WO 2007/056241 A2 | 5/2007 |
| WO | WO 2007/079245 A2 | 7/2007 |
| WO | WO 2007/082103 A2 | 7/2007 |
| WO | WO 2007/112090 A2 | 10/2007 |
| WO | WO 2008/039725 A2 | 4/2008 |
| WO | 2008101711 A2 | 8/2008 |
| WO | WO 2009/045196 A1 | 4/2009 |
| WO | WO 2009/058992 A2 | 5/2009 |
| WO | 2010083198 A1 | 7/2010 |
| WO | WO 2010/074173 A1 | 7/2010 |
| WO | WO 2010/121255 A1 | 10/2010 |
| WO | WO 2010/126980 A2 | 11/2010 |

(56) References Cited

FOREIGN PATENT DOCUMENTS

| WO | WO 2010/151560 A1 | 12/2010 |
|---|---|---|
| WO | WO 2011/017450 A2 | 2/2011 |
| WO | WO 2011/017476 A1 | 2/2011 |
| WO | WO 2011/017599 A1 | 2/2011 |
| WO | WO 2011/034984 A1 | 3/2011 |
| WO | WO 2011/094294 A2 | 8/2011 |
| WO | WO 2011/119650 A2 | 9/2011 |
| WO | WO 2012/074905 A2 | 6/2012 |
| WO | WO 2012/074907 A2 | 6/2012 |
| WO | WO 2012/074911 A2 | 6/2012 |
| WO | WO 2012/074940 A2 | 6/2012 |
| WO | WO 2013/055391 A1 | 4/2013 |
| WO | WO 2013/059687 A1 | 4/2013 |
| WO | WO 2013/059695 A1 | 4/2013 |
| WO | WO 2013/070249 A1 | 5/2013 |
| WO | WO 2013/074907 A1 | 5/2013 |

OTHER PUBLICATIONS

Angelino, G., and Invernizzi, C.M., "Carbon Dioxide Power Cycles using Liquid Natural Gas as Heat Sink", Applied Thermal Engineering Mar. 3, 2009, 43 pages.

Bryant, John C., Saari, Henry, and Zanganeh, Kourosh, "An Analysis and Comparison of the Simple and Recompression Supercritical CO2 Cycles" Supercritical CO2 Power Cycle Symposium, May 24-25, 2011, Boulder, CO, 8 pages.

Chapman, Daniel J., Arias, Diego A., "An Assessment of the Supercritical Carbon Dioxide Cycle for Use in a Solar Parabolic Trough Power Plant", Presentation, Abengoa Solar, Apr. 29-30, 2009, Troy, NY, 20 pages.

Chapman, Daniel J., Arias, Diego A., "An Assessment of the Supercritical Carbon Dioxide Cycle for Use in a Solar Parabolic Trough Power Plant", Paper, Abengoa Solar, Apr. 29-30, 2009, Troy, NY, 5 pages.

Chen, Yang, Lundqvist, P., Johansson, A., Platell, P., "A Comparative Study of the Carbon Dioxide Transcritical Power Cycle Compared with an Organic Rankine Cycle with R123 as Working Fluid in Waste Heat Recovery", Science Direct, Applied Thermal Engineering, Jun. 12, 2006, 6 pages.

Chen, Yang, "Thermodynamic Cycles Using Carbon Dioxide as Working Fluid", Doctoral Thesis, School of Industrial Engineering and Management, Stockholm, Oct. 2011, 150 pages., (3 parts).

Chordia, Lalit, "Optimizing Equipment for Supercritical Applications", Thar Energy LLC, Supercritical CO2 Power Cycle Symposium, May 24-25, 2011, Boulder, CO, 7 pages.

Combs, Osie V., "An Investigation of the Supercritical CO2 Cycle (Feher cycle) for Shipboard Application", Massachusetts Institute of Technology, May 1977, 290 pages.

Di Bella, Francis A., "Gas Turbine Engine Exhaust Waste Heat Recovery Navy Shipboard Module Development", Supercritical CO2 Power Cycle Symposium, May 24-25, 2011, Boulder, CO, 8 pages.

Dostal, V., et al., A Supercritical Carbon Dioxide Cycle for Next Generation Nuclear Reactors, Mar. 10, 2004, 326 pages., (7 parts).

Dostal, Vaclav and Kulhanek, Martin, "Research on the Supercritical Carbon Dioxide Cycles in the Czech Republic", Czech Technical University in Prague, Symposium on SCO2 Power Cycles, Apr. 29-30, 2009, Troy, NY, 8 pages.

Dostal, Vaclav, and Dostal, Jan, "Supercritical CO2 Regeneration Bypass Cycle—Comparison to Traditional Layouts", Supercritical CO2 Power Cycle Symposium, May 24-25, 2011, Boulder, CO, 5 pages.

Eisemann, Kevin, and Fuller, Robert L., "Supercritical CO2 Brayton Cycle Design and System Start-up Options", Barber Nichols, Inc., Paper, Supercritical CO2 Power Cycle Symposium, May 24-25, 2011, Boulder, CO, 7 pages.

Eisemann, Kevin, and Fuller, Robert L., "Supercritical CO2 Brayton Cycle Design and System Start-up Options", Presentation, Supercritical CO2 Power Cycle Symposium, May 24-25, 2011, Boulder, CO, 11 pages.

Feher, E.G., et al., "Investigation of Supercritical (Feher) Cycle", Astropower Laboratory, Missile & Space Systems Division, Oct. 1968, 152 pages.

Fuller, Robert L., and Eisemann, Kevin, "Centrifugal Compressor Off-Design Performance for Super-Critical CO2", Barber Nichols, Inc. Presentation, Supercritical CO2 Power Cycle Symposium, May 24-25, 2011, Boulder, CO, 20 pages.

Fuller, Robert L., and Eisemann, Kevin, "Centrifugal Compressor Off-Design Performance for Super-Critical CO2", Paper, Supercritical CO2 Power Cycle Symposium, May 24-25, 2011, Boulder, CO, 12 pages.

Gokhstein, D.P. and Verkhivker, G.P. "Use of Carbon Dioxide as a Heat Carrier and Working Substance in Atomic Power Stations", Soviet Atomic Energy, Apr. 1969, vol. 26, Issue 4, pp. 430-432.

Gokhstein, D.P.; Taubman, E.I.; Konyaeva, G.P., "Thermodynamic Cycles of Carbon Dioxide Plant with an Additional Turbine After the Regenerator", Energy Citations Database, Mar. 1973, 1 Page, Abstract only.

Hejzlar, P. et al., "Assessment of Gas Cooled Gas Reactor with Indirect Supercritical CO2 Cycle" Massachusetts Institute of Technology, Jan. 2006, 10 pages.

Hoffman, John R., and Feher, E.G., "150 kwe Supercritical Closed Cycle System", Transactions of the ASME, Jan. 1971, pp. 70-80.

Jeong, Woo Seok, et al., "Performance of S-CO2 Brayton Cycle with Additive Gases for SFR Application", Korea Advanced Institute of Science and Technology, Supercritical CO2 Power Cycle Symposium, May 24-25, 2011, Boulder, CO, 5 pages.

Johnson, Gregory A., & McDowell, Michael, "Issues Associated with Coupling Supercritical CO2 Power Cycles to Nuclear, Solar and Fossil Fuel Heat Sources", Hamilton Sundstrand, Energy Space & Defense-Rocketdyne, Apr. 29-30, 2009, Troy, NY, Presentation, 18 pages.

Kawakubo, Tomoki, "Unsteady Roto-Stator Interaction of a Radial-Inflow Turbine with Variable Nozzle Vanes", ASME Turbo Expo 2010: Power for Land, Sea, and Air; vol. 7: Turbomachinery, Parts A, B, and C; Glasgow, UK, Jun. 14-18, 2010, Paper No. GT2010-23677, pp. 2075-2084, (1 page, Abstract only).

Kulhanek, Martin, "Thermodynamic Analysis and Comparison of S-CO2 Cycles", Presentation, Czech Technical University in Prague, Supercritical CO2 Power Cycle Symposium, May 24-25, 2011, Boulder, CO, 14 pages.

Kulhanek, Martin, "Thermodynamic Analysis and Comparison of S-CO2 Cycles", Paper, Czech Technical University in Prague, Supercritical CO2 Power Cycle Symposium, May 24-25, 2011, Boulder, CO, 7 pages.

Kulhanek, Martin., and Dostal, Vaclav, "Supercritical Carbon Dioxide Cycles Thermodynamic Analysis and Comparison", Abstract, Faculty Conference held in Prague, Mar. 24, 2009, 13 pages.

Ma, Zhiwen and Turchi, Craig S., "Advanced Supercritical Carbon Dioxide Power Cycle Configurations for Use in Concentrating Solar Power Systems", National Renewable Energy Laboratory, Supercritical CO2 Power Cycle Symposium, May 24-25, 2011, Boulder, CO, 4 pages.

Moisseytsev, Anton, and Sienicki, Jim, "Investigation of Alternative Layouts for the Supercritical Carbon Dioxide Brayton Cycle for a Sodium-Cooled Fast Reactor", Supercritical CO2 Power Cycle Symposium, Troy, NY, Apr. 29, 2009, 26 pages.

Munoz De Escalona, Jose M., "The Potential of the Supercritical Carbon Dioxide Cycle in High Temperature Fuel Cell Hybrid Systems", Paper, Thermal Power Group, University of Seville, Supercritical CO2 Power Cycle Symposium, May 24-25, 2011, Boulder, CO, 6 pages.

Munoz De Escalona, Jose M., et al., "The Potential of the Supercritical Carbon Dioxide Cycle in High Temperature Fuel Cell Hybrid Systems", Presentation, Thermal Power Group, University of Seville, Supercritical CO2 Power Cycle Symposium, May 24-25, 2011, Boulder, CO, 19 pages.

Muto, Y., et al., "Application of Supercritical CO2 Gas Turbine for the Fossil Fired Thermal Plant", Journal of Energy and Power Engineering, Sep. 30, 2010, vol. 4, No. 9, 9 pages.

Noriega, Bahamonde J.S., "Design Method for s-CO2 Gas Turbine Power Plants", Master of Science Thesis, Delft University of Technology, Oct. 2012, 122 pages., (3 parts).

(56) References Cited

OTHER PUBLICATIONS

Oh, Chang, et al., "Development of a Supercritical Carbon Dioxide Brayton Cycle: Improving PBR Efficiency and Testing Material Compatibility", Presentation, Nuclear Energy Research Initiative Report, Oct. 2004, 38 pages.
Oh, Chang; et al., "Development of a Supercritical Carbon Dioxide Brayton Cycle: Improving VHTR Efficiency and Testing Material Compatibility", Presentation, Nuclear Energy Research Initiative Report, Final Report, Mar. 2006, 97 pages.
Parma, ED, et al., "Supercritical CO2 Direct Cycle Gas Fast Reactor (SC-GFR) Concept" Presentation for Supercritical CO2 Power Cycle Symposium, May 24-25, 2011, Boulder, CO, 40 pages.
Parma, ED, et al., "Supercritical CO2 Direct Cycle Gas Fast Reactor (SC-GFR) Concept", Supercritical CO2 Power Cycle Symposium, May 24-25, 2011, Boulder, CO, 9 pages.
Parma, Edward J., et al., "Supercritical CO2 Direct Cycle Gas Fast Reactor (SC-GFR) Concept", Presentation, Sandia National Laboratories, May 2011, 55 pages.
PCT/US2006/049623—Written Opinion of ISA dated Jan. 4, 2008, 4 pages.
PCT/US2007/001120—International Search Report dated Apr. 25, 2008, 7 pages.
PCT/US2007/079318—International Preliminary Report on Patentability dated Jul. 7, 2008, 5 pages.
PCT/US2010/031614—International Search Report dated Jul. 12, 2010, 3 pages.
PCT/US2010/031614—International Preliminary Report on Patentability dated Oct. 27, 2011, 9 pages.
PCT/US2010/039559—International Preliminary Report on Patentability dated Jan. 12, 2012, 7 pages.
PCT/US2010/044476—International Search Report dated Sep. 29, 2010, 23 pages.
PCT/US2010/044681—International Search Report and Written Opinion mailed Oct. 7, 2010, 10 pages.
PCT/US2010/044681—International Preliminary Report on Patentability dated Feb. 16, 2012, 9 pages.
PCT/US2010/049042—International Search Report and Written Opinion dated Nov. 17, 2010, 11 pages.
PCT/US2010/049042—International Preliminary Report on Patentability dated Mar. 29, 2012, 18 pages.
PCT/US2011/029486—International Preliminary Report on Patentability dated Sep. 25, 2012, 6 pages.
PCT/US2011/029486—International Search Report and Written Opinion dated Nov. 16, 2011, 9 pages.
PCT/US2011/062266—International Search Report and Written Opinion dated Jul. 9, 2012, 12 pages.
PCT/US2011/062198—International Search Report and Written Opinion dated Jul. 2, 2012, 9 pages.
PCT/US2011/062201—International Search Report and Written Opinion dated Jun. 26, 2012, 9 pages.
PCT/US2011/062204—International Search Report dated Nov. 1, 2012, 10 pages.
PCT/US2011/62207—International Search Report and Written Opinion dated Jun. 28, 2012, 7 pages.
PCT/US2012/000470—International Search Report dated Mar. 8, 2013, 10 pages.
PCT/US2012/061151—International Search Report and Written Opinion dated Feb. 25, 2013, 9 pages.
PCT/US2012/061159—International Search Report dated Mar. 2, 2013, 10 pages.
Persichilli, Michael, et al., "Supercritical CO2 Power Cycle Developments and Commercialization: Why sCO2 can Displace Steam" Echogen Power Systems LLC, Power-Gen India & Central Asia 2012, Apr. 19-21, 2012, New Delhi, India, 15 pages.
Saari, Henry, et al., "Supercritical CO2 Advanced Brayton Cycle Design", Presentation, Carleton University, Supercritical CO2 Power Cycle Symposium, May 24-25, 2011, Boulder, CO, 21 pages.
San Andres, Luis, "Start-Up Response of Fluid Film Lubricated Cryogenic Turbopumps (Preprint)", AIAA/ASME/SAE/ASEE Joint Propulsion Conference, Cincinnati, OH, Jul. 8-11, 2007, 38 pages.
Sarkar, J., and Bhattacharyya, Souvik, "Optimization of Recompression S-CO2 Power Cycle with Reheating" Energy Conversion and Management 50 (May 17, 2009), pp. 1939-1945.
Tom, Samsun Kwok Sun, "The Feasibility of Using Supercritical Carbon Dioxide as a Coolant for the Candu Reactor", The University of British Columbia, Jan. 1978, 156 pages.
VGB PowerTech Service GmbH, "CO2 Capture and Storage", A VGB Report on the State of the Art, Aug. 25, 2004, 112 pages.
Vidhi, Rachana, et al., "Study of Supercritical Carbon Dioxide Power Cycle for Power Conversion from Low Grade Heat Sources", Presentation, University of South Florida and Oak Ridge National Laboratory, Supercritical CO2 Power Cycle Symposium, May 24-25, 2011, Boulder, CO, 17 pages.
Vidhi, Rachana, et al., "Study of Supercritical Carbon Dioxide Power Cycle for Power Conversion from Low Grade Heat Sources", Paper, University of South Florida and Oak Ridge National Laboratory, Supercritical CO2 Power Cycle Symposium, May 24-25, 2011, Boulder, CO, 8 pages.
Wright, Steven A., et al., "Modeling and Experimental Results for Condensing Supercritical CO2 Power Cycles", Sandia Report, Jan. 2011, 47 pages.
Wright, Steven A., et al., "Supercritical CO2 Power Cycle Development Summary at Sandia National Laboratories", May 24-25, 2011, (1 page, Abstract only).
Wright, Steven, "Mighty Mite", Mechanical Engineering, Jan. 2012, pp. 41-43.
Yoon, Ho Joon, et al., "Preliminary Results of Optimal Pressure Ratio for Supercritical CO2 Brayton Cycle coupled with Small Modular Water Cooled Reactor", Presentation, Korea Advanced Institute of Science and Technology and Khalifa University of Science, Technology and Research, Boulder, CO, May 25, 2011, 18 pages.
Yoon, Ho Joon, et al., "Preliminary Results of Optimal Pressure Ratio for Supercritical CO2 Brayton Cycle coupled with Small Modular Water Cooled Reactor", Paper, Korea Advanced Institute of Science and Technology and Khalifa University of Science, Technology and Research, May 24-25, 2011, Boulder, CO, 7 pages.
PCT/US2010/039559 Notification of Transmittal of the International Search Report and the Written Opinion of the International Searching Authority, or the Declaration dated Sep. 1, 2010.
CN Search Report for Application No. 201080035382.1, 2 pages.
CN Search Report for Application No. 201080050795.7, 2 pages.
PCT/US2011/062198—Extended European Search Report dated May 6, 2014, 9 pages.
PCT/US2011/062201—Extended European Search Report dated May 28, 2014, 8 pages.
PCT/US2013/055547—Notification of Transmittal of the International Search Report and the Written Opinion of the International Searching Authority, or the Declaration dated Jan. 24, 2014, 11 pages.
PCT/US2013/064470—Notification of Transmittal of the International Search Report and the Written Opinion of the International Searching Authority, or the Declaration dated Jan. 22, 2014, 10 pages.
PCT/US2013/064471—Notification of Transmittal of the International Search Report and the Written Opinion of the International Searching Authority, or the Declaration dated Jan. 24, 2014, 10 pages.
PCT/US2014/013154—International Search Report dated May 23, 2014, 4 pages.
PCT/US2014/013170—Notification of Transmittal of the International Search Report and the Written Opinion of the International Searching Authority, or the Declaration dated May 9, 2014, 12 pages.

(56) References Cited

OTHER PUBLICATIONS

PCT/US2014/023026—Notification of Transmittal of the International Search Report and the Written Opinion of the International Searching Authority, or the Declaration dated Jul. 22, 2014, 11 pages.
PCT/US2014/023990—Notification of Transmittal of the International Search Report and the Written Opinion of the International Searching Authority, or the Declaration dated Jul. 17, 2014, 10 pages.
PCT/US2014/026173—Notification of Transmittal of the International Search Report and the Written Opinion of the International Searching Authority, or the Declaration dated Jul. 9, 2014, 10 pages.
Renz, Manfred, "The New Generation Kalina Cycle", Contribution to the Conference: "Electricity Generation from Enhanced Geothermal Systems", Sep. 14, 2006, Strasbourg, France, 18 pages.
Thorin, Eva, "Power Cycles with Ammonia-Water Mixtures as Working Fluid", Doctoral Thesis, Department of Chemical Engineering and Technology Energy Processes, Royal Institute of Technology, Stockholm, Sweden, 2000, 66 pages.

* cited by examiner

US 9,441,504 B2

SYSTEM AND METHOD FOR MANAGING THERMAL ISSUES IN ONE OR MORE INDUSTRIAL PROCESSES

RELATED APPLICATION DATA

This patent application claims priority to U.S. Provisional Patent Application No. 61/219,1956, filed on Jun. 22, 2009, entitled "System and Method for Managing Thermal Issues in Gas Turbine Engines," the entirety of which is hereby incorporated by reference herein.

FIELD OF THE INVENTION

The present invention generally relates to a system that enables one to both: (i) address various thermal management issues (e.g., inlet air cooling) in gas turbines, gas turbine engines, industrial process equipment and/or internal combustion engines; and (ii) yield a supercritical fluid-based heat engine. In one embodiment, the present invention utilizes at least one working fluid selected from ammonia, carbon dioxide, nitrogen, or other suitable working fluid medium. In another embodiment, the present invention utilizes carbon dioxide or ammonia as a working fluid to achieve a system that enables one to address inlet cooling issues in a gas turbine, internal combustion engine or other industrial application while also yielding a supercritical fluid based heat engine as a second cycle using the waste heat from the gas turbine and/or internal combustion engine to create a combined power cycle.

BACKGROUND OF THE INVENTION

Various approaches have been suggested to address various thermal management issues (e.g., inlet air cooling, waste heat recovery) in gas turbines, gas turbine engines, internal combustion engines and other industrial processes. Such approaches include those discussed in the report entitled *Experimental and Theoretical Investigations of New Power Cycles and Advanced Falling Film Heat Exchangers* by the U.S. Department of Energy in conjunction with the University of New Mexico.

In this report two new thermodynamic cycles were proposed and investigated based on the second law of thermodynamics. Two computer programs were developed to find effect of important system parameters on the irreversibility distribution of all components in the cycle: (1) the first cycle was based on a combined triple (Brayton/Rankine/Rankine)/(Gas/steam/ammonia) cycle capable of producing high efficiencies; and (2) the second cycle is a combined (Brayton/Rankine)/(gas/ammonia) cycle with integrated compressor inlet air-cooling capable of producing high power and efficiency. The proposed cycles and the results obtained from the second law analyses of the cycles were published in Energy Conversion and Management and ASME proceedings (IMEC&E 2001).

Given the above, there is a need in the art for systems that are designed to address various thermal management issues for various devices (e.g., gas turbines, gas turbine engines, industrial process equipment and/or internal combustion engines). In one instance, there is a need for a system that is able to address various thermal management issues (e.g., inlet air cooling) in gas turbines, gas turbine engines, internal combustion engines and/or other industrial process equipment.

SUMMARY OF THE INVENTION

The present invention generally relates to a system that enables one to both: (i) address various thermal management issues (e.g., inlet air cooling) in gas turbines, gas turbine engines, industrial process equipment and/or internal combustion engines; and (ii) yield a supercritical fluid-based heat engine. In one embodiment, the present invention utilizes at least one working fluid selected from ammonia, carbon dioxide, nitrogen, or other suitable working fluid medium. In another embodiment, the present invention utilizes carbon dioxide or ammonia as a working fluid to achieve a system that enables one to address inlet cooling issues in a gas turbine, internal combustion engine or other industrial application while also yielding a supercritical fluid based heat engine as a second cycle using the waste heat from the gas turbine and/or internal combustion engine to create a combined power cycle.

In one embodiment, the present invention relates to a system that is designed to both achieve inlet air cooling in gas turbines, gas turbine engines, internal combustion engines and/or other industrial processes (e.g., gas or air compression) while also yielding a supercritical fluid-based heat engine as a second cycle using the waste heat from the gas turbine, internal combustion engine, and/or other industrial process to create a combined power cycle as shown and described herein.

In another embodiment, the present invention relates to a system for temperature conditioning inlet air for a turbine comprising: at least one turbine having an inlet side and an outlet side; at least one air inlet heat exchanger operatively coupled to the inlet side of the at least one turbine, wherein the at least one air inlet heat exchanger is designed to remove heat from inlet air being supplied to the inlet side of the at least one turbine and transfer such heat via a working fluid to a bottom loop; at least one air outlet heat exchanger operatively coupled to the outlet side of the at least one turbine, wherein the at least one air outlet heat exchanger is designed to remove heat from outlet air being generated by the at least one turbine and transfer such heat via a working fluid to the bottom loop; wherein the bottom loop is designed to utilize such transferred heat from the at least one air inlet heat exchanger and the at least one air outlet heat exchanger to provide suitably conditioned working fluid back to both the at least one air inlet heat exchanger and the at least one air outlet heat exchanger.

In still another embodiment, the present invention relates to a method for temperature conditioning inlet air for a turbine, the method comprising the steps of: providing at least one turbine having an inlet side and an outlet side; providing at least one air inlet heat exchanger operatively coupled to the inlet side of the at least one turbine, wherein the at least one air inlet heat exchanger is designed to remove heat from inlet air being supplied to the inlet side of the at least one turbine and transfer such heat via a working fluid to a bottom loop; providing at least one air outlet heat exchanger operatively coupled to the outlet side of the at least one turbine, wherein the at least one air outlet heat exchanger is designed to remove heat from outlet air being generated by the at least one turbine and transfer such heat via a working fluid to the bottom loop; wherein the bottom loop transfers heat from the at least one air inlet heat exchanger and the at least one air outlet heat exchanger to provide suitably conditioned working fluid back to both the at least one air inlet heat exchanger and the at least one air outlet heat exchanger.

In still yet another embodiment, the present invention relates to a system for temperature conditioning air comprising: at least one heat source; at least one first heat exchanger operatively coupled to the at least one heat source and designed to remove and/or utilize waste heat from the heat source to transfer such heat to a working fluid; at least one compressor operatively coupled via the working fluid to the at least one first heat exchanger, wherein the at least one compressor is designed receive the heat-laden working fluid generated by the at least one first heat exchanger and to utilize, or bleed heat from, the heat laden working fluid so as to yield a cooled working fluid; at least one second heat exchanger operatively coupled to the at least one compressor, wherein the at least one second heat exchanger is designed to receive the cooled working fluid and to utilize the cooled working fluid to remove heat from, or condition the temperature of, air.

DETAILED DESCRIPTION OF THE INVENTION

Figure 1:
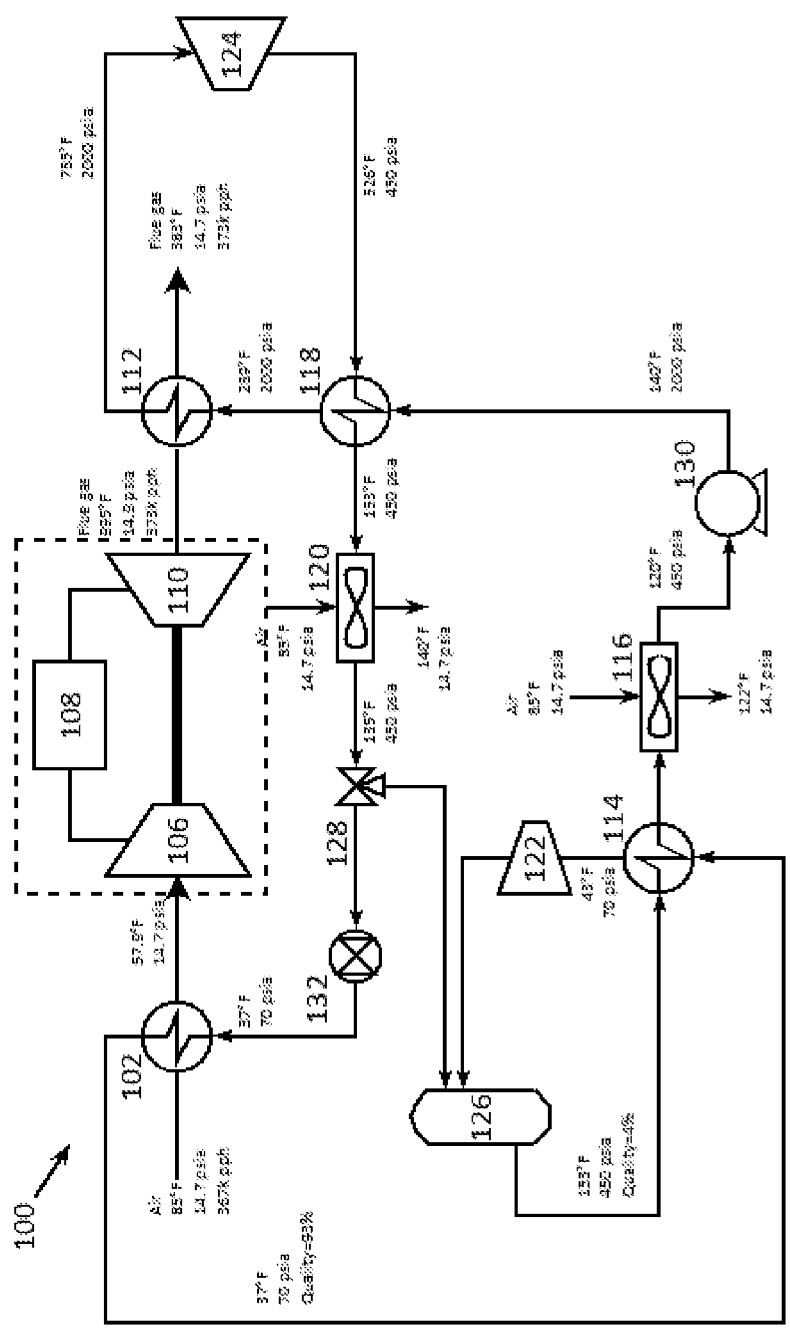
FIG. 1 is an illustration of a system in accordance with one embodiment of the present invention.

The present invention generally relates to a system that enables one to both: (i) address various thermal management issues (e.g., inlet air cooling) in gas turbines, gas turbine engines, industrial process equipment and/or internal combustion engines; and (ii) yield a supercritical fluid-based heat engine. In one embodiment, the present invention utilizes at least one working fluid selected from ammonia, carbon dioxide, nitrogen, or other suitable working fluid medium. In another embodiment, the present invention utilizes carbon dioxide or ammonia as a working fluid to achieve a system that enables one to address inlet cooling issues in a gas turbine, internal combustion engine or other industrial application while also yielding a supercritical fluid based heat engine as a second cycle using the waste heat from the gas turbine and/or internal combustion engine to create a combined power cycle.

In one embodiment, the purpose of the present invention is twofold: (i) to act as a supercritical fluid-based heat engine as a second cycle using the waste heat from a gas turbine and/or internal combustion engine (ICE) to create a combined power cycle; and (ii) to have an integrated solution for gas turbine/ICE inlet air cooling (schematic attached). In this embodiment, the present invention is designed to be primarily a bottom cycle heat engine with a dynamic vapor compression chilling component that can be used when higher ambient conditions are encountered and thus increase overall output of combined cycle. In another embodiment, the supercritical fluid-based cycle can be used to provide intake charge cooling for an air or gas compression device, thus reducing the thermodynamic work required for compression. The heat input for this process could in whole or in part be provided by the waste heat of compression.

In one embodiment, the present invention will be described in relation to a General Electric GE-10 gas turbine. However, the present invention is not limited thereto. Rather the present invention can be applied to any suitable turbine, gas turbine, industrial process equipment and/or internal combustion engine. Given this, the predicted performance for the embodiment of FIG. 1 involves the working conditions of a General Electric GE-10 gas turbine and the advantages gained by utilizing an integrated system in accordance with one embodiment of the present invention. For illustrative purposes, up to 28 percent of a typically gas turbine's (e.g., a GE-10) power is lost when the ambient temperature rises from 15° C. (59° F.) to 45° C. (113° F.). At the same time, the cost of electricity can increase substantially during hot days due to increased demand from residential and commercial air conditioning. The performance decrease of the gas turbine also leads to decreased performance of the second cycle performance. For example, a 5.0 percent decrease in output power occurs in a $NH_3$ second cycle the exemplar GE10 over the aforementioned temperature variance/difference.

Regarding the embodiment where the present invention is applied to a General Electric 10 (GE-10) gas turbine, the example calculations herein involve a GE-10 gas turbine operating at 15° C. (59° F.) and 30° C. (86° F.) ambient temperatures. The flue gas temperature of the gas turbine per the GE-10 operating specifications is 489.5° C. (914° F.) and 505° C. (941° F.) at 15° C. (59° F.) and 30° C. (86° F.) ambient, respectively. The flue gas mass flows without inlet cooling at these two ambient conditions are 47 kg/s (373,086 lbs/hr) and 42 kg/s (333,396 lbs/hr) respectively. The flue gas mass flow rate for the integrated inlet cooled condition matches the 15° C. (59° F.) situation. The amount of intake air for the integrated inlet cooled condition is determined by removing the mass of natural gas needed based on the prescribed heat rate and 9,570 kJ/kg (20,000 btu/lb) for natural gas. The incoming air flow rate used for the integrated solution is 46.2 kg/s (366,966 lbs/hr).

The performance of an ammonia-driven second cycle using the waste heat from the GE-10 at 15° C. (59° F.) will add 3,310 kW of net energy to an 11,250 kW output of a GE-10 gas turbine equating to a combined cycle output of 14,560 kW. This equates to a 29.4 percent increase in power over a single cycle. Without inlet cooling at the 30° C. (86° F.) ambient condition, the amount of power delivered by the second cycle decreases to 3,189 kW at 30° C. (86° F.). Combined with a drop in the gas turbine rated power to 10,000 kW, the total power output from the combined cycle decreases by 9.4 percent. The decrease in the second cycle output power is a direct result of the decrease in gas turbine power.

When adding the integrated cooling cycle, the gas turbine power no longer drops to 10,000 kW but remains at 11,250 kW due to the consistent 15° C. (59° F.) inlet air temperature regardless of ambient temperature. In addition, the heat rate of the simple cycle remains at 11,500 kJ/kW-hr (10,900 Btu/kW-hr) as opposed to increasing to 12,100 kJ/kW-hr (11,374 Btu/kW-hr) at 30° C. (86° F.). The second cycle output drops to 3,123 kW due to the addition of the compressor energy. The increase in gas turbine performance plus the ammonia second cycle output leads to a combined cycle output of 14,374 kW; an 9.0 percent increase on the 30° C. (86° F.) day over the basic ammonia combined cycle and a 45.1 percent increase on simple cycle performance at the same ambient temperature.

In the instance where an ammonia working fluid is utilized in connection with a GE-10, some variations in operating conditions can include the following: high side pressures typically range from 10.3-20.7 MPa (1500-3000 psia), high side temperatures typically range from 149° C.-482° C. (300-900° F.), low side heat engine pressures typically range from 2.1-4.2 MPa (300-600 psia), refrigeration pressures typically range from 0.1-0.69 MPa (14.7-100 psia) and ambient conditions as high as 50° C. (12° F.). Given this, the present invention is not restricted to any one set of operating conditions, nor to a particular working fluid. Rather, the present invention, as would be appreciated by one of skill in the art, can be designed to operate across a broad range of various conditions, and with several different working fluids. As such, the present invention is to be broadly construed in light of the disclosure contained herein.

In one embodiment, the present invention yields various advantages including, but not limited to, (i) the use of supercritical fluid removes the temperature pinch point that is involved with vaporization as well as the issues dealing with two phase flow; (ii) the use of supercritical fluid will lead to a waste heat exchanger design that allows for higher working fluid temperatures relative to a single pressure steam-based heat recovery steam generator; (iii) the use of supercritical carbon dioxide or ammonia allows for an operation of a cycle in which there is no condensing within the turbine without the addition of a superheater.

The present invention also permits one to achieve consistent mass flow through the power cycle while generating a variable amount of refrigeration for the inlet cooler as the ambient temperature changes. In one embodiment, this is achieved by removing the refrigerant after the power cycle's condensing step and reintroducing it prior to the pump. One advantage of this is that the power cycle, which will be running at all times, will remain at the same operating point at all times in terms of pressures, mass flow as well as temperatures. This consistency of operation will allow all components to perform optimally and thus keep the cycle efficiency at its design point. As the need for refrigerant is increased on hot days, working fluid will be removed from the low-pressure side of the system, but will be reintroduced in a usable form prior to the pump without affecting the power cycle.

Additionally, the present invention enables one to take a side stream of working fluid from any point on the high pressure portion of the power generation cycle and use that for an ejector on the cooling cycle. This will allow for a lower cost component as well as the avoidance of decreased performance due to compressor motor efficiencies (there will still be an efficiency loss associated with the ejector).

Additionally, in another embodiment, the present invention enables any nitrogen and hydrogen constituents that may be created within the ammonia-based process to be separated out and do one or more of the following with said nitrogen and/or hydrogen: (i) regenerate ammonia through the Haber process and add generated ammonia back to system; (ii) collect the free hydrogen and use as feed stock for combustion and/or fuel cell; (iii) collect hydrogen and nitrogen separately and collect for commercial consumption; and/or (iv) vent the nitrogen and flare the hydrogen. It should be noted that items (i) to (iv) above are exemplary in nature and many other potential uses for any such nitrogen and/or hydrogen generated by the systems of the present invention exist but are not enumerated here for the sake of brevity.

The present invention also enables one to recycle flue gas from the back end of the gas turbine to the inlet thereby achieving an increased ability to capture $CO_2$ emissions from the gas turbine by providing a more concentrated $CO_2$ stream, and to reduce $NO_X$ emissions through reduction in peak flame temperature. The main road block to this process is the high temperature at which the recycled flue gas, up to 40 percent of the flue gas flow, would be re-introduced to the inlet. The integrated solution of the present invention and illustrated in FIG. 1 eliminates this problem in several ways.

First, the flue gas will already be cooled to a lower temperature from the heat exchanger removing heat for the power generation cycle. Second, an increase in refrigerant can be sent to the inlet air to offset any temperature increase introduced by the recycled flue gas. Third, the recuperator can be decreased in effectiveness thus allowing more energy to be removed from the flue gas. This will allow for a lower flue gas temperature and can then be added to the inlet of the gas turbine without effecting performance.

The present invention also enables one to integrate current ammonia based selective catalytic reducers (SCR) with the ammonia based heat engine. SCR units are used with gas turbines in order to reduce $NO_x$ emissions to meet EPA standards. A side stream of ammonia can be removed from anywhere in the system and injected into the flue gas stream with a makeup system adding ammonia back to the heat engine prior to the pump.

FIG. 1 discloses a system 100 in accordance with one embodiment of the present invention. In system 100, ammonia is utilized to achieve a system that enables one to address inlet cooling issues in a gas turbine and/or an internal combustion engine while also yielding a supercritical ammonia based heat engine as a second cycle using the waste heat from the gas turbine and/or internal combustion engine to create a combined power cycle. As is illustrated in FIG. 1, system 100 includes a heat exchanger 102 that is designed to lower the inlet temperature of air supplied to turbine 104. Turbine 104 can be any suitable turbine including, but not limited to, a gas turbine. In one embodiment, turbine 104 is composed of compressor 106, combustor 108 and turbine 110. As should be recognized by those of skill in the art, the present invention is not limited to just a gas turbine, or to a gas turbine having the afore-mentioned configuration. Rather, the present invention is to be broadly construed and is applicable to a wide range of air-breathing engines, or other industrial processes such as gas or air compression, where the temperature control of inlet air is desired. As used herein, any compressor utilized in conjunction with the embodiments of the present invention can be independently selected from a mechanical compressor or a fluid compressor (e.g., an ejector).

Regarding heat exchanger 102, any suitable heat exchanger can be used including, but not limited to, one or more heat exchangers that each contain therein one or more cores where each core utilizes microchannel technology.

As used herein, "microchannel technology" includes, but is not limited to, heat exchangers that contain one or more microchannels, mesochannels, and/or minichannels. As used herein the terms "microchannels," "mesochannels," and/or "minichannels" are utilized interchangeably. Additionally, the microchannels, mesochannels, and/or minichannels of the present invention are not limited to any one particular size, width and/or length. Any suitable size, width or length can be utilized depending upon a variety of factors. Furthermore, any orientation of the microchannels, mesochannels, and/or minichannels can be utilized in conjunction with the various embodiments of the present invention.

In another embodiment, a heat exchanger in accordance with the present invention can be formed with one or more cores having one or more printed circuit heat exchange (PCHE) panels. Such panels are known in the art, and are described in U.S. Pat. Nos. 6,921,518; 7,022,294; and 7,033,553, all of which are incorporated herein by reference, in their entireties, for their teachings related to printed circuit heat exchange (PCHE) panels. Other suitable heat exchangers for use as a regenerator in the system of FIG. 1 are disclosed in United States Published Patent Application No. 2006/0254759, the disclosure of which is incorporated herein in its entirety.

In still another embodiment, any type of heat exchanger known to those of skill in the art can be utilized herein so long as such heat exchanger has the capacity to manage and/or meet the thermal requirements of the system in which it is incorporated. In still yet another embodiment, the present invention is not only concerned with providing a system that enables one to address various thermal management issues in advanced gas turbine engines but also to a system that is designed to address power management issues.

Regarding turbine 104, flue gases therefrom are supplied by any suitable conveyance means to another heat exchanger 112. Regarding heat exchanger 112, this heat exchanger can be selected from heat exchangers similar to those discussed above with regard to heat exchanger 102. Additionally, as is illustrated in FIG. 1, inlet air is cooled by heat exchanger 102 and supplied to turbine 104 via any suitable conveyance means. In turn, the sub-components of turbine 104 are also suitably connected as is known to those of skill in the art. Regarding suitable conveyance means, such means include, but are not limited to, conduits, pipes, ducts, flues, etc. that are designed to withstand the various environmental conditions experienced in the turbine applications disclosed herein. Such design criteria are not discussed herein for the sake of brevity as they are well known to those of skill in the art.

As can be seen in the embodiment of FIG. 1, system 100 utilizes a suitable working fluid in combination with various heat exchangers and suitable conveyance means to pull "heat" from inlet air that enters heat exchanger 102 thereby yielding cooled inlet air to turbine 104. Regarding system 100 of FIG. 1, the working fluid can be any suitable working fluid including, but not limited to, ammonia, carbon dioxide (be it supercritical or otherwise), nitrogen, inert working fluids, or any suitable combination of two or more thereof. In one instance, the system of FIG. 1 utilizes an ammonia working fluid. As will be appreciated upon reading and understanding FIG. 1, the working fluid of the present invention is not always in a liquid state. Rather, as would be apparent to those of skill in the art, the working fluid of the present invention undergoes various phase changes in order to accomplish the stated goals of system 100.

As can be seen in FIG. 1, system 100 contains various additional heat exchangers (e.g., heat exchangers 114, 116, 118 and 120), at least one additional compressor (e.g., 122), at least one additional expander (e.g., 124), a suitable number of valves (e.g., 128), a static mixer (e.g., 126), at least one pump (e.g., 130) and at least one expansion valve (e.g., 132). As would be appreciated by those of skill in the art, the process parameters detailed in FIG. 1 are exemplary in nature and in no way are meant to limit the scope of the present invention. Rather, the present invention is broadly applicable to a wide range of situations where it is desired to "pull" heat from one point, or area, of a system and "move" it to another point, or area.

In another embodiment, static mixer 126 can be modified as follows. The mixer 126 could be designed to have low temperature liquid coming in the top, high temperature vapor coming in from suitable point in the middle with any additional cooling needed for condensing being added. This condensing could be integrated with heat exchangers 114 and 116. All condensed liquid will be pulled off the bottom.

Regarding the additional components in the two bottom loops of system 100, the various additional heat exchangers can be selected from the heat exchangers discussed above. The at least one additional compressor (e.g., 122), the at least one additional expander (e.g., 124), the valves (e.g., 126 and 128), the at least one pump (e.g., 130) and the at least one expansion valve (e.g., 132) can be selected from a wide range of known components of these types that are available on the market, or can be purpose-designed for the disclosed system. Again, the additional components of the bottom loops of FIG. 1 are connected via suitable conveyance means selected from those discussed above. The type of components selected in this case will depend on the exact design specifications of the system to be created.

One such arrangement for all of the above identified components of system 100 is illustrated in FIG. 1. In FIG. 1, system 100 is utilized to reduce the temperature of inlet air from an ambient of, for example, 86° F. to 59° F. This is accomplished by utilizing heat exchanger 102 and a working fluid that is supplied to heat exchanger 102. The reduced temperature air is then supplied as inlet air to turbine 104 which is designed to burn fuel (e.g., natural gas, coal or oil) and supply exhaust gas and waste heat to heat exchanger 112.

Figure 3:
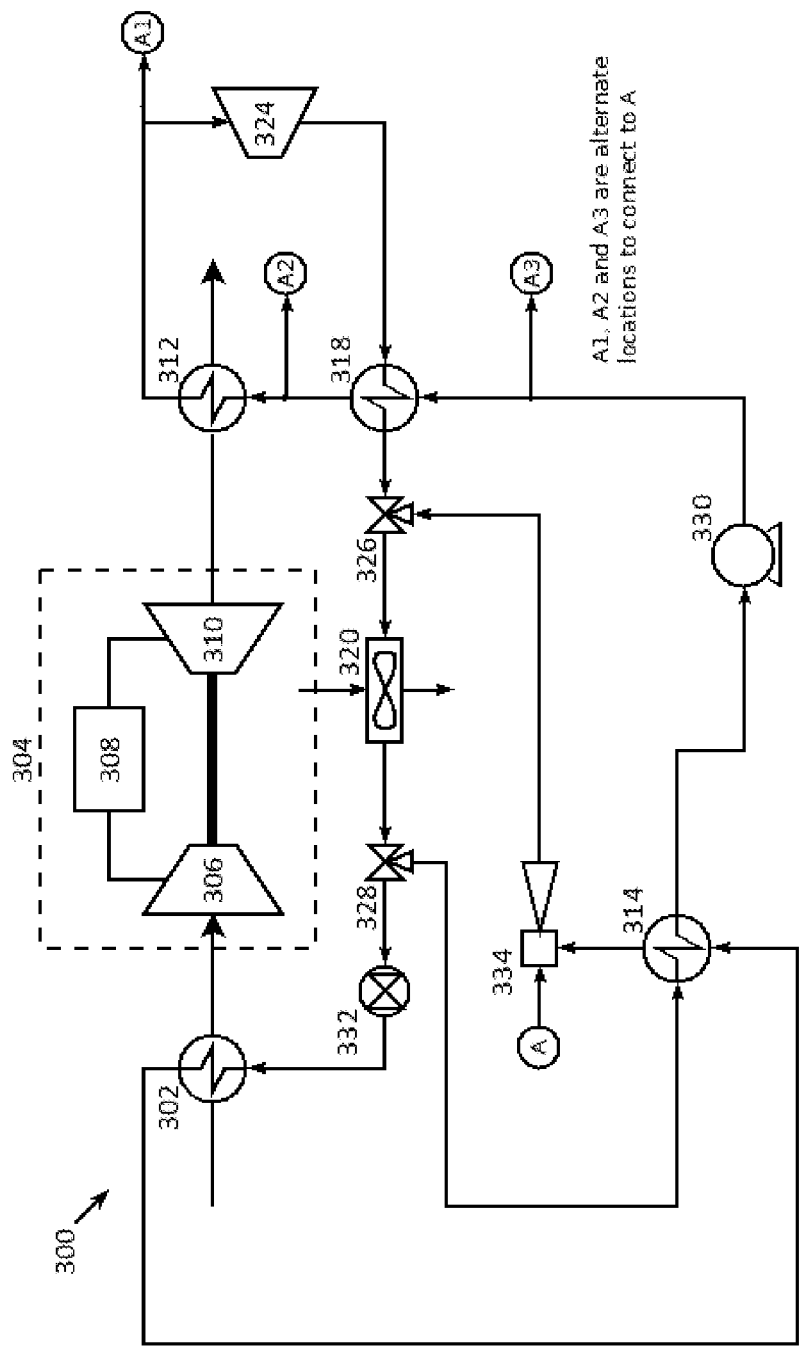
FIG. 3 is an illustration of another system in accordance with one embodiment of the present invention.

In another embodiment, various components of system 100 can be eliminated to yield a simplified system depending upon the goal to be accomplished. Alternatively, various components of system 100 can be replaced by control valves and an ejector. FIG. 3 is an illustration of a system 300 showing the ejector 334 in place of compressor 122 from FIG. 1. The driving fluid for the ejector can be derived from prior to heat exchanger 318, prior to heat exchanger 312 or prior to expander 324. A control valve will be added to the system at the optimal point for removing fluid to act as the driving fluid for the ejector.

Figure 4:
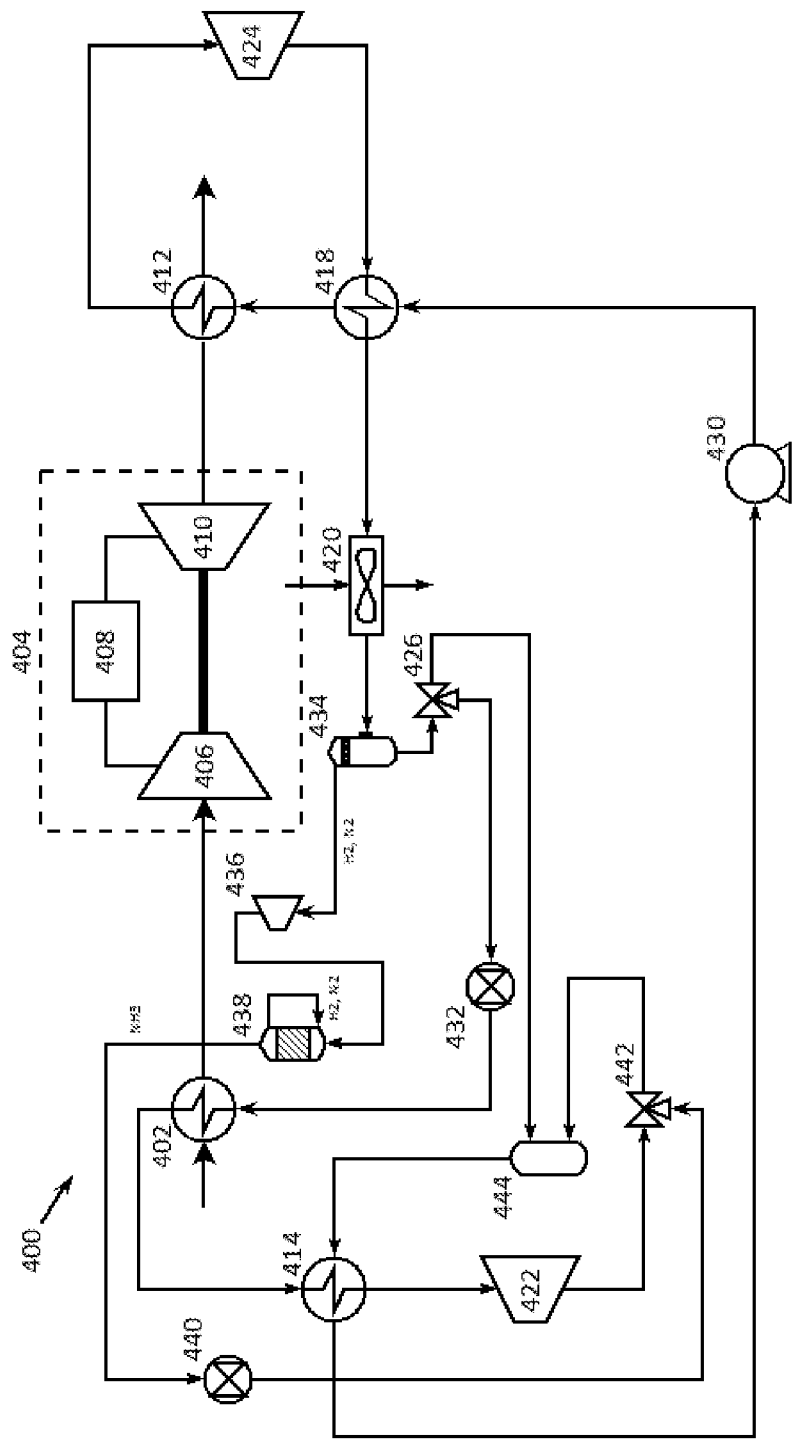
FIG. 4 is an illustration of another system in accordance with one embodiment of the present invention.
Figure 5:
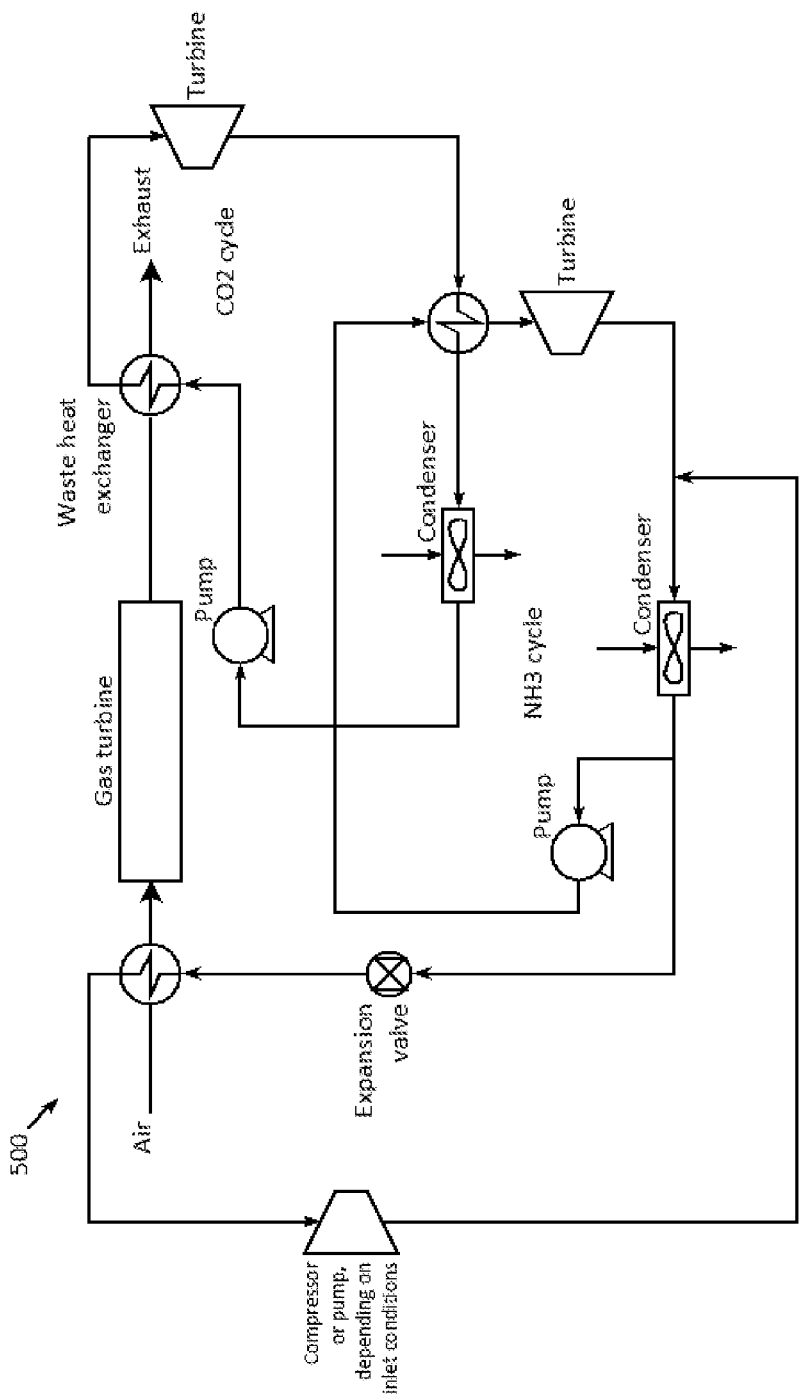
FIG. 5 is an illustration of another system in accordance with one embodiment of the present invention.

In another embodiment, components can be added to system 100 in order to separate and collect any hydrogen or nitrogen gas created during thermal cycling of the ammonia working fluid within the heat engine. FIG. 4 is an illustration of a system 400 which uses the same heat engine and inlet cooling as FIG. 1. However, system 400 includes a Haber process reactor to regenerate ammonia. FIG. 4 shows the addition of flash tank 434 which separates gaseous nitrogen and hydrogen still present after ammonia condensing step in heat exchanger 420. Gaseous nitrogen and hydrogen are separated in flash tank 434 and supplied to compressor 436 where they are compressed to reaction pressure. Compressed nitrogen and hydrogen are delivered to a catalytic reactor 438 with the product being gaseous ammonia and excess nitrogen and hydrogen being recycled to the front end of the reactor. Heat will need to be delivered to catalytic reactor 438, this could come from an external source or from internal waste heat. This ammonia is expanded through expansion valve 440 to the low side operating pressure of the heat engine. The expanded fluid is combined with compressed gas valve 442. All other components within FIG. 4 are consistent with FIG. 1. In still another embodiment, system 400 can be designed to utilize a $CO_2$ Brayton or Rankine top cycle to handle the direct exchange from a gas turbine exhaust (FIG. 5).

Figure 2:
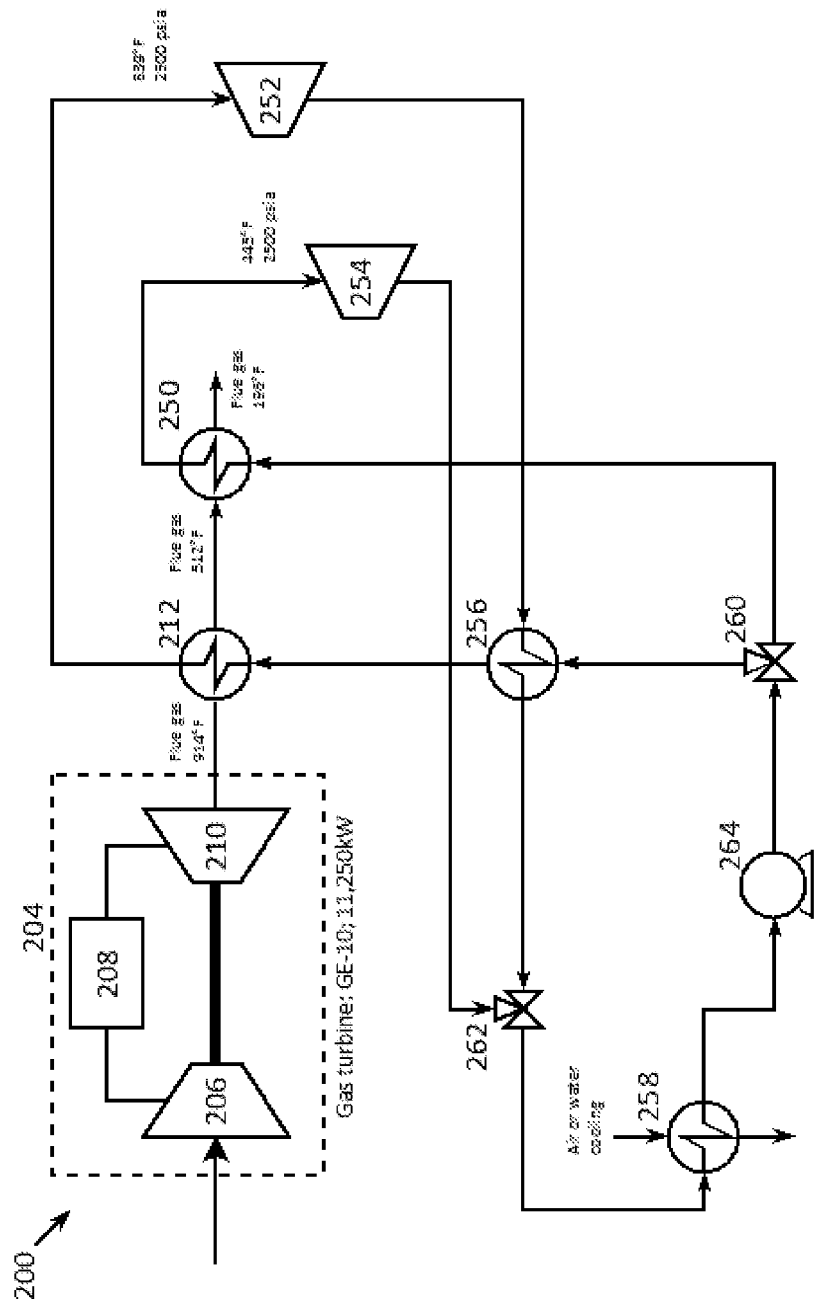
FIG. 2 is an illustration of another system in accordance with one embodiment of the present invention.

FIG. 2 is an illustration of a system 200 in accordance with another embodiment of the present invention where exit gases of turbine 204 are cooled using a working fluid based system in accordance with the present invention. In one embodiment, the working fluid is carbon dioxide. However, this embodiment is not limited thereto. Rather, any suitable working fluid, or combination of working fluids, can be utilized in connection with this embodiment. Turbine 204 of system 200 is composed of compressor 206, combustor 208 and turbine 210. Turbine 204 supplies flue gases to heat exchanger 212 which are then cooled and supplied for further cooling to heat exchanger 250. Heat exchangers 212 and 250 are connected to a double loop system that utilizes a working fluid selected from those discussed above to pull heat from the flue gases generated by turbine 204. As used herein, "turbine" is intended to mean a gas turbine, a gas turbine engine, an internal combustion engine, or any other item of industrial process equipment that produces exhaust and takes in air.

As shown in FIG. 2, system 200 includes at least one additional heat exchanger (e.g., 256 and 258), at least one additional compressor (e.g., 252), at least one additional expander (e.g., 254), various valves (e.g., 260 and 262), and at least one pump (e.g., 260). Again, the additional components of the bottom loops of FIG. 2 are connected via suitable conveyance means selected from those discussed above. The type of components selected in this case will depend on the exact design specifications of the system to be created.

As would be appreciated by those of skill in the art, the process parameters detailed in FIG. 2 are exemplary in nature and in no way are meant to limit the scope of the present invention. Rather, the present invention is broadly applicable to a wide range of situations where it is desired to "pull" heat from one point, or area, of a system and "move" it to another point, or area.

FIG. 5 is an illustration of yet another embodiment of the present invention where the present invention contains at least two distinct loops and each loop utilizes its own working fluid. In one instance, each loop can use the same or different working fluids. Suitable working fluids are chosen from those noted above. In another embodiment, different working fluids are utilized in each loop. In one instance, one loop utilizes $CO_2$ as a working fluid and the other utilizes ammonia ($NH_3$). As can be seen in FIG. 5 inlet air for a gas turbine is cooled using a dual cycle system where one cycle utilizes carbon dioxide as a working fluid and the other cycle utilizes ammonia as a working fluid. In this embodiment, the two cycles are interconnected via one heat exchanger.

The system 500 of FIG. 5 comprises a heat exchanger 502 that is positioned at the inlet end of a gas turbine 504, wherein heat exchanger 502 is of a type or design as discussed above and is able to utilize a working fluid to condition the temperature of an inlet gas (e.g., air) prior to entry of the inlet gas into gas turbine 504. Gas turbine 504 supplies waste heat to a waste heat exchanger 506 which is of a type or design as discussed above. Waste heat exchanger 506 is operatively coupled to a turbine 508 and a pump 510. As can be seen from FIG. 5, pump 510 is also operatively coupled to a condenser 512. Turbine 508, condenser 512 and a second turbine 514 are all operatively coupled to a heat exchanger 516 as is illustrated in FIG. 5. Turbine 514 is operatively coupled to a second condenser 518. Condenser 518 is, as is illustrated in FIG. 5, also operatively coupled to a compressor, or pump, 520, a expansion valve 522 and a second pump 524, as is illustrated in FIG. 5. Compressor, or pump, 520 and expansion valve 522 are also both operatively coupled to heat exchanger 502 in the manner illustrated in FIG. 5. Finally, in the embodiment of FIG. 5, second pump 524 is operatively coupled to heat exchanger 516 in a manner illustrated in FIG. 5.

Regarding FIGS. 1 through 5, these Figures illustrate embodiments of the present invention that are designed to achieve the simultaneous air, or gas, inlet cooling in combination with the utilization of waste heat from any industrial, or combustion, process. Given this, FIGS. 1 through 5 are illustrative of only exemplary embodiments of the present invention and thus, modifications of these embodiments are within the scope of the present invention and would be apparent to one of skill in the art.

Industrial, or combustion, processes that benefit from the systems of the present invention include any industrial, or combustion, processes where such a process becomes more efficient when a gas (e.g., air) is conditioned in such a manner as to increase its density and/or reduce its temperature. In one embodiment, such processes include, but are not limited to, those processes carried out by gas turbines, internal combustion engines, air compressors, gas compressors, or any combination thereof. In one embodiment, the present invention is advantageous in that it permits the temperature conditioning of an inlet gas in order to permit an increase in the operating efficiency of a device that is subject to performance degradation when the inlet temperature of the intake gas increases.

In still another embodiment, the present invention comprises a combination of a sub-system designed to achieve the temperature conditioning of a gas (e.g., an inlet gas or inlet air for an industrial process) with a sub-system designed to utilize waste heat to power the sub-system designed to achieve the temperature conditioning as well as, in some embodiments, permit the waste heat sub-system to generate additional usable energy or power that can be utilized for any desired purpose. Thus, in this embodiment, the waste heat sub-system of the present invention is sometimes referred to herein as a bottom loop, circuit, or cycle that utilizes a working fluid, as defined herein, to achieve the aforementioned goal(s). Accordingly, in one instance, the present invention achieves the integration of a sub-system designed to achieve the temperature conditioning of a gas (e.g., an inlet gas or inlet air for an industrial process) with a sub-system designed to utilize waste heat to drive the aforementioned temperature conditioning sub-system as well as to permit the waste heat sub-system to generate additional usable energy or power that can be utilized for any desired purpose. In one instance, this embodiment is achieved by a bottom loop (as can be seen in the bottom portions of FIGS. 1 through 5), that utilizes waste heat provided to the bottom loop to drive and accomplish the aforementioned temperature conditioning as well as operating as a heat engine that can generate, or produce, additional power, or energy, that can be exported out of the system and used for any desired purpose.

Regarding the temperatures and/or pressures disclosed in any, or all of, FIGS. 1 through 5, these temperatures and pressures are exemplary in nature. As would be apparent to those of skill in the art, depending upon the device and/or conditions to which the present invention is being applied such temperatures and pressures may, can or will change. Additionally, in some instances, the systems of the present invention will be transcritical or supercritical. As such, as would be known to those of skill in the art upon reading and understanding the present disclosure, some portions of the systems of the present invention will be sub-critical, while other portions will be supercritical. In fact, one aspect of the inventive system is that the working fluid may be a supercritical fluid, a sub-critical liquid and/or a sub-critical vapor in different locations within the inventive system.

Although the invention has been described in detail with particular reference to certain aspects detailed herein, other aspects can achieve the same results. Variations and modifications of the present invention will be obvious to those skilled in the art, and the present invention is intended to cover in the appended claims all such modifications and equivalents.

What is claimed is:

1. A system for temperature conditioning inlet gas, comprising:
a gas turbine having an inlet side and an outlet side;
at least one gas inlet heat exchanger operatively coupled to the inlet side of the gas turbine, wherein the at least one gas inlet heat exchanger is configured to remove heat from inlet gas being supplied to the inlet side of the gas turbine prior to entry of the inlet gas into the gas turbine and transfer such heat via a working fluid to a bottom loop;
at least one gas outlet heat exchanger operatively coupled to the outlet side of the gas turbine and fluidly coupled with the bottom loop, wherein the at least one gas outlet heat exchanger is configured to remove heat from outlet gas being generated by the gas turbine and transfer such heat via the working fluid to the bottom loop,
wherein the bottom loop is configured to utilize such transferred heat from the at least one gas inlet heat exchanger and the at least one gas outlet heat exchanger to provide suitably conditioned working fluid back to both the at least one gas inlet heat exchanger and the at least one gas outlet heat exchanger, and comprises:
at least one bottom loop expander fluidly coupled to the at least one gas inlet heat exchanger and directly fluidly coupled to the at least one gas outlet heat exchanger, wherein the at least one bottom loop expander is configured to receive a heat-laden working fluid from the at least one gas outlet heat exchanger and yield a cooled working fluid; and
at least one bottom loop heat exchanger fluidly coupled with the at least one bottom loop expander, the at least one outlet heat exchanger, and the at least one gas inlet heat exchanger, wherein the at least one bottom loop heat exchanger is disposed downstream from the at least one bottom loop expander and upstream of the at least one gas inlet heat exchanger and the at least one gas outlet heat exchanger, the at least one bottom loop heat exchanger being configured to receive the cooled working fluid from the at least one bottom loop expander and transfer the cooled working fluid to the at least one gas inlet heat exchanger.

2. The system of claim 1, wherein the working fluid is selected from ammonia, carbon dioxide, or a combination thereof.

3. The system of claim 2, wherein the working fluid is carbon dioxide.

4. The system of claim 3, wherein the working fluid is supercritical carbon dioxide.

5. The system of claim 2, wherein the working fluid is ammonia.

6. The system of claim 5, wherein the working fluid is supercritical ammonia.

7. The system of claim 1, wherein the at least one gas inlet heat exchanger comprises microchannels.

8. The system of claim 1, wherein the at least one gas inlet heat exchanger comprises one or more printed circuit heat exchanger cores.

9. The system of claim 1, wherein the at least one gas outlet heat exchanger comprises microchannels.

10. The system of claim 1, wherein the at least one gas outlet heat exchanger comprises one or more printed circuit heat exchanger cores.

11. The system of claim 1, wherein the bottom loop is configured to utilize waste heat at the outlet side of the gas turbine in combination with the at least one gas inlet heat exchanger to yield a reduction in a temperature of the inlet gas provided to the inlet side of the gas turbine.

12. The system of claim 11, wherein and
the cooled working fluid from the at least one bottom loop heat exchanger is provided to the at least one gas inlet heat exchanger for use in the reduction of the temperature of the inlet gas provided to the inlet side of the gas turbine.

13. The system of claim 1, wherein the bottom loop is a heat engine configured to utilize transferred heat to condition the inlet gas and generate surplus power or energy.

14. The system of claim 1, wherein the inlet gas comprises air.

15. A method for temperature conditioning inlet gas, the method comprising:
providing a gas turbine having an inlet side and an outlet side;
providing at least one gas inlet heat exchanger operatively coupled to the inlet side of the gas turbine, wherein the at least one gas inlet heat exchanger is configured to remove heat from inlet gas being supplied to the inlet side of the gas turbine prior to entry of the inlet gas into the gas turbine and transfer such heat via a working fluid to a bottom loop; and
providing at least one gas outlet heat exchanger operatively coupled to the outlet side of the gas turbine, wherein the at least one gas outlet heat exchanger is configured to remove heat from outlet gas being generated by the gas turbine and transfer such heat via the working fluid to the bottom loop,
wherein the bottom loop transfers heat from the at least one gas inlet heat exchanger and the at least one gas outlet heat exchanger to provide suitably conditioned working fluid back to both the at least one gas inlet heat exchanger and the at least one gas outlet heat exchanger, and comprises:
at least one bottom loop expander fluidly coupled to the at least one gas inlet heat exchanger and directly fluidly coupled to the at least one gas outlet heat exchanger, wherein the at least one bottom loop expander is configured to receive a heat-laden working fluid from the at least one gas outlet heat exchanger and yield a cooled working fluid; and
at least one bottom loop heat exchanger fluidly coupled with the at least one bottom loop expander, the at least one outlet heat exchanger, and the at least one gas inlet heat exchanger, wherein the at least one bottom loop heat exchanger is disposed downstream from the at least one bottom loop expander and upstream of the at least one gas inlet heat exchanger and the at least one gas outlet heat exchanger, the at least one bottom loop heat exchanger being configured to receive the cooled working fluid from the at least one bottom loop expander and transfer the cooled working fluid to the at least one gas inlet heat exchanger.

16. The method of claim 15, wherein the working fluid is selected from ammonia, carbon dioxide, or a combination thereof.

17. The method of claim 16, wherein the working fluid is carbon dioxide.

18. The method of claim 17, wherein the working fluid is supercritical carbon dioxide.

19. The method of claim 16, wherein the working fluid is ammonia.

20. The method of claim 19, wherein the working fluid is supercritical ammonia.

21. The method of claim 15, wherein the at least one gas inlet heat exchanger comprises microchannels.

22. The method of claim 15, wherein the at least one gas inlet heat exchanger comprises one or more printed circuit heat exchanger cores.

23. The method of claim 15, wherein the at least one gas outlet heat exchanger comprises microchannels.

24. The method of claim 15, wherein the at least one gas outlet heat exchanger comprises one or more printed circuit heat exchanger cores.

25. The method of claim 15, wherein the bottom loop utilizes waste heat at the outlet side of the gas turbine in combination with the at least one gas inlet heat exchanger to yield a reduction in a temperature of the inlet gas provided to the inlet side of the gas turbine.

26. The method of claim 15, wherein the cooled working fluid from the at least one bottom loop heat exchanger is provided to the at least one gas inlet heat exchanger for use in a reduction of a temperature of the inlet gas provided to the inlet side of the gas turbine.

27. The method of claim 15, wherein the bottom loop is a heat engine configured to utilize transferred heat to condition the inlet gas and generate surplus power or energy.

* * * * *